US009580961B2

(12) United States Patent
Kraemer

(10) Patent No.: US 9,580,961 B2
(45) Date of Patent: Feb. 28, 2017

(54) UTILITY VEHICLE WITH MONITORING SYSTEM FOR MONITORING THE POSITION OF THE VEHICLE

(71) Applicant: IVECO MAGIRUS AG, Ulm (DE)

(72) Inventor: Jens Kraemer, Ulm/Donau (DE)

(73) Assignee: IVECO MAGIRUS AG, Ulm (DE)

( * ) Notice: Subject to any disclaimer, the term of this patent is extended or adjusted under 35 U.S.C. 154(b) by 0 days.

(21) Appl. No.: 14/435,888

(22) PCT Filed: Oct. 16, 2013

(86) PCT No.: PCT/EP2013/071626
§ 371 (c)(1),
(2) Date: Apr. 15, 2015

(87) PCT Pub. No.: WO2014/060476
PCT Pub. Date: Apr. 24, 2014

(65) Prior Publication Data

US 2015/0330146 A1 Nov. 19, 2015

(30) Foreign Application Priority Data

Oct. 17, 2012 (EP) .................................... 12188798

(51) Int. Cl.
*G01M 17/00* (2006.01)
*E06C 5/34* (2006.01)
(Continued)

(52) U.S. Cl.
CPC ................ *E06C 5/34* (2013.01); *B66C 23/78* (2013.01); *B66F 11/044* (2013.01);
(Continued)

(58) Field of Classification Search
CPC .. A62C 27/00; B60Q 9/00; E06C 5/04; B66F 17/006; B66C 23/70; G01C 15/002
(Continued)

(56) References Cited

U.S. PATENT DOCUMENTS

| | | | | |
|---|---|---|---|---|
| 5,368,317 A * | 11/1994 | McCombs | ................ | E06C 5/04 182/66.1 |
| 2003/0193562 A1* | 10/2003 | Corzillus | .................. | B60R 1/00 348/148 |
| 2006/0076189 A1* | 4/2006 | Ziaylek | ..................... | E06C 5/04 182/127 |

FOREIGN PATENT DOCUMENTS

| | | |
|---|---|---|
| CN | 102514550 A | 6/2012 |
| EP | 1536098 | 6/2005 |

(Continued)

OTHER PUBLICATIONS

PCT International Search Report and Written Opinion mailed Feb. 3, 2014 for PCT International Application No. PCT/EP2013/071626, 4 pages.

(Continued)

*Primary Examiner* — Gertrude Arthur Jeanglaud
(74) *Attorney, Agent, or Firm* — Remarck Law Group PLC

(57) ABSTRACT

The present invention relates to a utility vehicle, in particular to a firefighting vehicle, including an aerial apparatus (i.e. a turnable ladder and/or an aerial rescue platform) and lateral ground supports movable between retracted positions and extracted operating positions in which the ends of the supports rest on the ground. The vehicle includes a monitoring system for monitoring the position of the vehicle. The system includes surveillance cameras at the sides of the vehicle, each camera being allocated to one support to monitor the ground area on which the end of this support rests in its operating position and to take a real-time image of the respective ground area. The system also includes a visual display presenting the images of all cameras at the same time in different screen areas, superposed by visual markings representing expected operating positions of the supports.

11 Claims, 3 Drawing Sheets

(51) Int. Cl.

| | |
|---|---|
| ***B66F 11/04*** | (2006.01) |
| ***E06C 5/38*** | (2006.01) |
| ***B66C 23/78*** | (2006.01) |
| ***B66F 17/00*** | (2006.01) |
| ***E06C 5/04*** | (2006.01) |
| ***E06C 5/02*** | (2006.01) |

(52) U.S. Cl.
CPC .............. *B66F 17/006* (2013.01); *E06C 5/02* (2013.01); *E06C 5/04* (2013.01); *E06C 5/38* (2013.01)

(58) Field of Classification Search
USPC ........... 701/34, 36, 34.4; 182/66.1; 362/485; 296/37.6
See application file for complete search history.

(56) References Cited

FOREIGN PATENT DOCUMENTS

| | | |
|---|---|---|
| JP | 2008074594 | 4/2008 |
| JP | 2009073248 | 4/2009 |

OTHER PUBLICATIONS

Office Action dated Jan. 28, 2016 for Chinese Application 201380053898.2, 9 pages.

* cited by examiner

UTILITY VEHICLE WITH MONITORING SYSTEM FOR MONITORING THE POSITION OF THE VEHICLE

CROSS-REFERENCE TO RELATED APPLICATIONS

This application is a 371 U.S. National Stage of International Application No. PCT/EP2013/071626, filed Oct. 16, 2013, which claims priority to European Application No. 12188798.8 filed on Oct. 17, 2012. The disclosure of each of the above applications is incorporated herein by reference in their entirety.

FIELD OF THE INVENTION

The present invention relates to a utility vehicle, in particular to a firefighting vehicle, comprising an aerial apparatus like a turnable ladder and/or an aerial rescue platform according to the preamble of claim 1.

PRIOR ART

For safe operation, vehicles of the above kind usually comprise safety means to provide a solid stand of the vehicle on the ground when the aerial apparatus is extracted and moved. It is of particular importance to avoid any tilting of the vehicle when the end of the aerial apparatus is moved into a lateral position projecting from the vehicle body. For the sake of simplicity reference is made only to turnable and extractable ladders in the following, like they are very common on rescue vehicles, while this should not be understood in a limiting sense, i.e. the present invention shall also be applicable to vehicles equipped with aerial rescue platforms that can be lifted and turned. Moreover, it is not restricted to rescue vehicles but can also be applied to any other utility vehicles equipped with cranes or the like that may cantilever to one side of the vehicle.

As such a safety means, lateral ground supports have become very common that are lifted from the ground in a retracted non-use position and can be extracted into an operating position in which the ends of the supports rest on the ground. For example, these lateral ground supports can be represented by outriggers that can be retracted or extended in a mainly horizontal direction so that their ends are located in a distance from the vehicle body in the operating position. The ends of the outriggers can be equipped with jacks to strut against the ground. Another possibility is to tilt the outrigger slightly downwards so that its end touches the ground. If such a touchdown of outriggers is provided at both sides of the vehicle, the support area for a vehicle is widened, giving the vehicle a secure stand. A third possibility is to locate the support more or less directly a the side of the vehicle body, e.g. in form of a jack as described above, so that the support is just lifted during non-use and it is lowered in its operating position. In the sense of the following description, the terms “retracted” or “extracted” with respect to the ground support shall not limit its operation to any spacial direction, i.e. horizontal or vertical, but shall just describe that the support is movable between two different working positions at the lateral side of the vehicle body.

It is often difficult in rescue situation to find the optimum position for a rescue vehicle, especially in narrow alleys between houses, parking cars and other obstacles. Valuable time is often lost in maneuvering the vehicle accordingly. A major problem in this situation is to find a position in which the ground supports can move into their operating positions without being obstructed by objects. Moreover, care must be taken not to position the ends of the supports on drain pits, manhole covers, soft ground surfaces like lawn areas and so on, because they do not provide a solid basis for the support. These problems are even aggravated by the fact that usually the sight conditions are very bad, for example, in a dark environment, and the operator is not able to overview the estimated operating positions of the supports, and usually he needs the help of another person who monitors the maneuvering.

SUMMARY OF THE INVENTION

It is the object of the present invention to provide a utility vehicle of the above kind, in particular a rescue vehicle like a firefighting vehicle, which makes the positioning of the supports in their operating positions easier, even in a narrow space, under bad visual conditions and without the help of a second person, to safe time for positioning the vehicle.

This object is achieved by a utility vehicle comprising the features of claim 1.

The utility vehicle according to the present invention is equipped with a monitoring system for monitoring the position of the vehicle including the ground supports. This monitoring system comprises surveillance cameras positioned at the sides of the vehicle. Each camera is allocated to one support to monitor the ground area in which the end of the support will rest in its operating position. That is, the support area of the support is comprised by the visual field of the respective camera. Each camera is provided to take a real-time image of the respective ground area. For visualizing this image, a visual display is provided.

The visual display presents the images of all cameras at the same time in different screen areas, superimposed by visual markings representing expected operating positions of the supports. This means that not only the different ground areas monitored by the cameras are visible on the display but also the final positions of the ground supports before they are actually moved into these positions. It is therefore possible to recognize the danger of a collision with an object, or an area of the ground that is not suitable for positioning the supports, before the supports are actually positioned. The operator looking at the display is given an overview over all areas in which the supports must be placed. For this reason the operator does not need the help of another person that overviews the positions of the supports directly.

The visual markings can be provided in different ways. According to one preferred embodiment of the present invention, the monitoring system comprises a control unit for operating the visual display that is provided to combine real-time image data generated by the cameras with calculated or pre-stored data representing expected operating positions of the supports, to generate images from these combined data in which the expected operating positions of the supports are visualized by visual markings. In this case the visual markings are generated directly within the images to be rendered on the visual display.

According to another preferred embodiment of the invention, the visual markings are permanent markings on the screen of the visual display. In this case the markings are not calculated or generated from pre-stored data but represent lines, dots or any other kind of marking that is fixed on the screen onto which the image is projected electronically.

According to a preferred embodiment of the present invention, the control unit is also provided to recognize objects within the visual field of the camera.

Preferably the control unit is provided to mark the objects recognized within the visual field of the camera by means of visual markings. This facilitates the recognition of the recognized objects, especially in situations with bad visibility.

More preferably, the control unit is provided to calculate the distances between the recognized objects within the visual field of the camera and the expected operating position of the outrigger, the present operating position of the support and/or the portion of the vehicle body, and to visualize the calculated distances within the image.

According to another preferred embodiment the aerial apparatus is turnable around a vertical turning axis, and the control unit is provided for operating the visual display to visualize the position of the turning axis. This facilitates the maneuvering of the vehicle into a position that is optimal for operating the aerial apparatus.

More preferably, each camera is fixed at the vehicle body in an elevated position above its allocated support with a downwardly tilted viewing angle. The corresponding image generated by the camera will be a perspective view onto the ground, showing the operation position of the support from above.

According to another preferred embodiment of the invention, the visual display is located within the driver's cabin of the vehicle.

The invention is further related to a method for positioning a utility vehicle, in particular a firefighting vehicle that comprises an aerial apparatus like a turnable ladder and/or an aerial rescue platform and lateral ground supports that are movable between retracted positions and extracted operating positions in which the ends of the supports rest on the ground, characterized by the steps of monitoring the ground area on which the end of the support rests in its operating position by means of a surveillance camera that is allocated to this support, and displaying the images of all cameras by means of a visual display at the same time in different screen areas, superimposed by visual markings representing expected operating positions of the supports.

A preferred embodiment of this method is characterized by combining real-time image data generated by the cameras with calculated or pre-stored data representing expected operating positions of the supports, and generating images from these combined data in which the expected operating positions of the supports are visualized by visual markings.

These and other aspects of the inventive will be apparent from and elucidated with reference to a preferred embodiment described hereinafter.

DETAILED DESCRIPTION OF THE INVENTION

Figure 1:
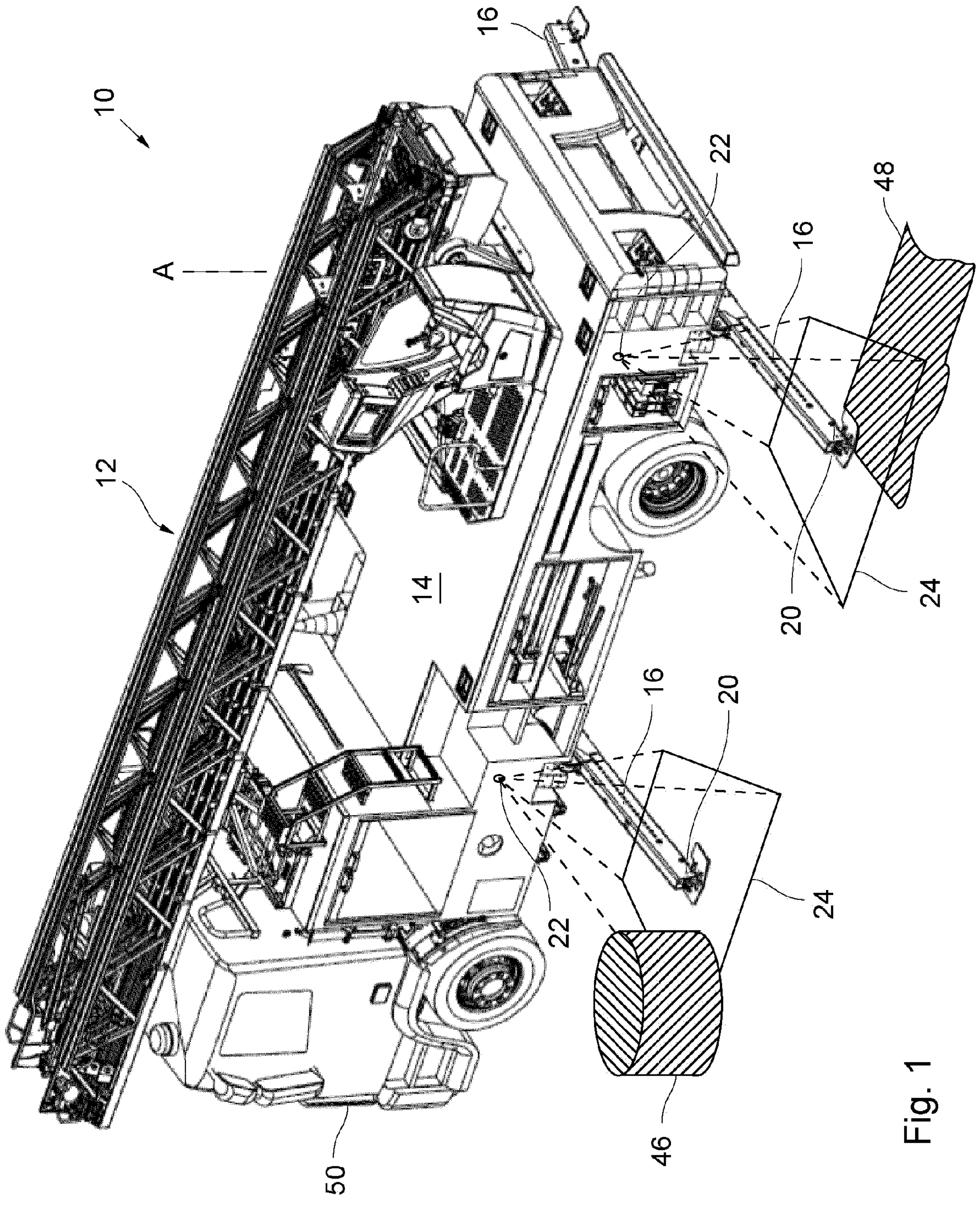
FIG. 1 is a perspective view of a firefighting vehicle as one embodiment of a utility vehicle according to the present invention.

The firefighting vehicle 10 in FIG. 1 is one example of a utility vehicle according to the present invention. The firefighting vehicle is equipped with a turnable ladder 12 on its top that is turnable around a vertical axis A and comprises a number of ladder segments that are slidably supported on each other so that the ladder 12 is extractable. If this extraction of the turnable ladder 12 is performed in a position where the ladder 12 is swiveled in lateral direction, i.e. in a right angle from the non-use position shown in FIG. 1, the weight of the ladder acts to tilt the vehicle body 14 around its horizontal longitudinal axis. To support the vehicle 10 safely on the ground, it is therefore necessary to provide an additional support means at the sides of the vehicle.

Ground supports 16 are provided at the sides of the vehicle body 14. These supports 16 comprise bars 18 that extend in mainly horizontal direction from the lower part of the vehicle body 14 in the lateral direction, i.e. rectangular to the driving direction. These bars 18 are extractable so that the supports 16 are movable between retracted positions, in which the outriggers 16 are positioned under the vehicle body 14 so that they do not protrude in a lateral direction from the vehicle, and extracted operation positions, as shown in FIG. 1, in which the ends 20 of the supports 16 rest on the ground in a distance from the respective sides from the vehicle 10. The contact to the ground is achieved by tilting the support 16 slightly downward, as in the present embodiment of the vehicle 10, or by any other suitable mechanism. A very common construction of supports 16 comprises jacks at their ends that have lower contact surfaces that can be pressed onto the ground in the operating position. However, the present invention is not limited to any construction but can refer to any suitable supporting mechanism of the supports 16.

When positioning the firefighting vehicle 10 in a rescue situation, maneuvering of the vehicle 10 can be difficult to find a position in which the supports 16 can find suitable operating positions. This is because the operating positions must be estimated by the driver of the vehicle 10, and this may be difficult at narrow places with obstacles in the lateral ground area, like parking cars, plant pots, etc. Another difficulty lies in finding a piece of ground to support the ends 20 of the supports 16 that is solid enough to resist against the forces acting onto the outriggers 16. Lawn areas etc. do not provide a sufficient resistance. In particular in situations with poor sight conditions, the driver of the vehicle 10 is often unable to monitor the area for placing the end 20 of the supports 16 accordingly, and he needs the help of another person for maneuvering the vehicle 10 and extracting the supports 16.

These problems of common firefighting vehicles are overcome by the firefighting vehicle 10 according to the present invention, which is equipped with a monitoring system. It comprises surveillance cameras at the side of the vehicle 10. In the present embodiment, there are four supports 16, namely two supports 16 at each side of the vehicle arranged in a distance, and there are also four surveillance cameras 22, each camera 22 being allocated to one supports 16. The respective camera 22 is fixed at the vehicle body 14 in an elevated position above its allocated supports 16, and its viewing angle is provided such that it comprises the ground area 24 on which the end 20 of the support 16 rests in its operating position. The viewing angle of the cameras 22 is slightly tilted in a downward direction to provide a perspective view from above to the ground area 24 for positioning the end 20 of the support 18.

Each camera is provided to generate a set of real time image data, representing a present image of the respective ground area 24. With other words, each camera 22 takes a real time image of the ground area 24.

Figure 2:
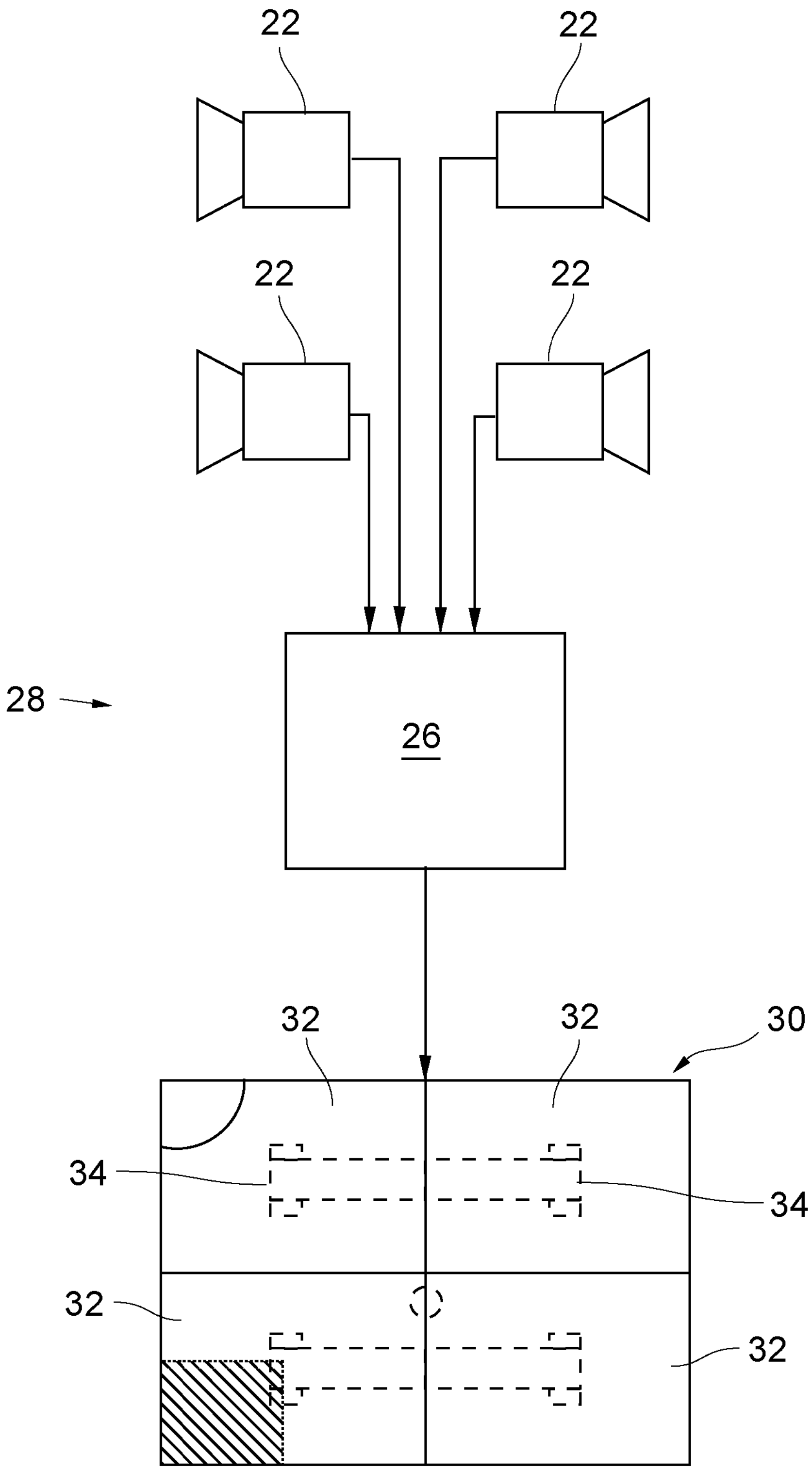
FIG. 2 is a schematic view of the monitoring system of the utility vehicle of claim 1.

For processing the sets of image data generated by the cameras 22, the monitoring system further comprises a control unit 26 shown schematically in FIG. 2, which further shows other components of the monitoring system 28, namely the cameras 22 and a visual display 30 for showing images 32 corresponding to the image data of the cameras 22 that are processed by the control unit 26. From each set of image data provided by one camera 22, corresponding to a picture of the monitored ground area 24 in the visual field of the camera, the control unit 26 generates an image 32. However, the image 32 does not show the ground area 24 alone but also the expected operating positions of the outriggers 16 as visual markings 34. These markings 34 can be rendered from pre-stored data representing expected operating positions of the supports, or from calculated data representing these expected operating positions. The control unit 26 is provided to combine the real-time image data generated by the cameras 22 with the calculated or pre-stored data related to the expected operating positions of the supports 16 to generate images 32 from these combined data in which the expected operating positions of the supports 16 are visualized by visual markings 34, superposed to the image of the ground area 24.

Another option is to fix the visual markings 34 permanently to the screen of the visual display 30 and to render the electronic image 32 by means of the display 30 so that both the image 32 and the permanent markings 34 are superposed. The expected operating positions of the supports 16, that are clearly defined within the visual field of the camera 22, can be related to the present position of the vehicle 10 on the ground to anticipate a possible collision of the supports 16 with an obstacle within the ground area 24, or to judge the ground conditions so as to avoid the placement of the end 20 of the support 16 onto a soft ground. In particular it is noted that the visual markings 34 enable the operator, for example the driver of the vehicle 10 to anticipate the operating position of the outrigger 16 before the support 16 reaches this position, before extracting the support 16 from its retracted position, to avoid a collision or any other mistake in placing the support 16.

Figure 3:
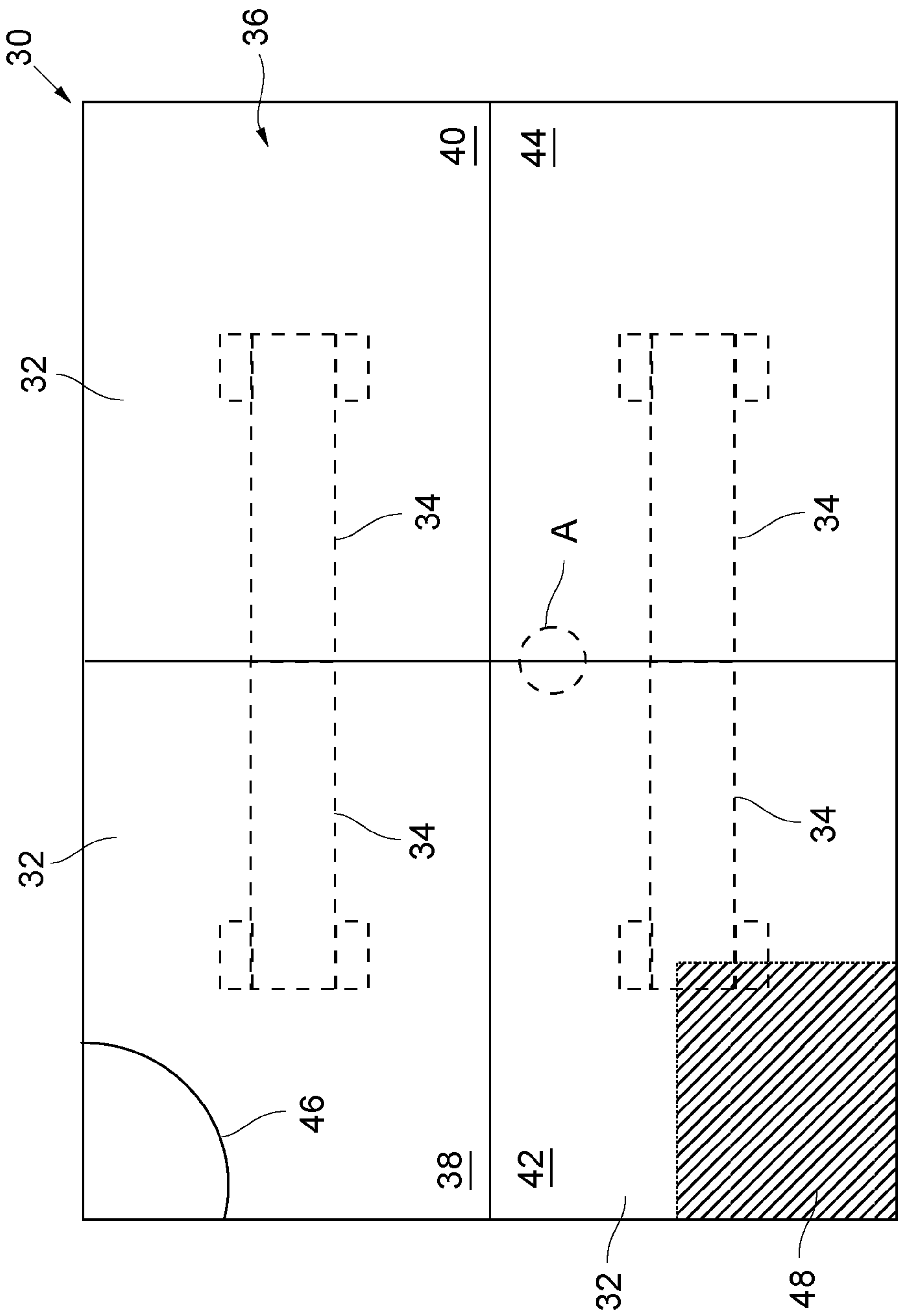
FIG. 3 is a schematic view of a screen display as one feature to the monitoring system of the utility vehicle of claim 1.

As it is shown in more detail in FIG. 3, which is an exemplary screenshot of the visual display as one example, the images 32 of all cameras 22 are shown at the same time in a split screen manner. The whole screen area 34 is divided in four parts of equal height and width. The upper left area 38 shows the image 32 corresponding to the front left camera 22 above the front left support 16 of the vehicle 10, the upper right area 40 corresponds to the front right camera 22, the bottom left area 42 corresponds to the front left camera 22, and the remaining bottom right area 44 corresponds to the rear right camera 22. The visual markings 34 showing the expected operating positions of the supports 16 and are also shown in the respective images in the areas 38, 40, 42, 44. When the outrigger finally reaches its extracted operating position, this will correspond to the visual marking 34.

The actual picture of the outrigger 16 moving into the visual field of the camera 22 will be apparent in the image 32 captured by the camera 22. Moreover, objects within the visual field of the camera, i.e. obstacles in the ground area 24 will also be visible in this picture 32. As one example of such an object that is also shown in FIG. 1, a plant pot within the ground area 24 one which the end 20 of the front left support 16 is supported is shown in the image 32 of the screen area 38. The operator will then be able to estimate whether there will be a collision of the support 16 with the object 46 by estimating the distance between the end of the visual marking 34 and the object 46. This estimation may be supported by marking also the object 46 by a corresponding visual marking. Moreover, the distance between the end of the visual marking 34 of the support 16 and the object 46 (or its visual marking, respectively) can be calculated by the control unit 26 and visualized by fading in the calculated distance within the image. It is also possible to calculate other distances by means of the control unit 26, for example, the distance between the object 46 and the vehicle body 14 and/or the distance between the present operating position of the support 16 and the object 46 (which is to be distinguished from the expected operation position of the support represented by the visual marking 34).

If the ground area 24 includes a soft ground portion that is not suitable for placing the end 20 of the support 16, this will also be visible in the respective image 32 in case the visual marking 34 of the expected operating position of the support 16 and the unsuitable ground area portion overlap. For example, in the bottom left screen area 42, the portion of lawn 48 is shown that is captured by the camera 22 on the rear left side of the vehicle 10. This lawn portion 48 (see also FIG. 1) overlaps with end of the visual marking 34, which means that there will be a positioning error which must be corrected by the driver of the vehicle 10 by maneuvering the vehicle 10. Other unsuitable areas may be man hole covers of the sewer network, drain pits or the like.

As one possible option, the cameras 22 are provided with infrared sensors to provide a good visibility even in a dark environment with poor sight.

For placing the firefighting vehicle 10 in a way that the turnable ladder 12 can be operated without colliding with obstacles, it is helpful to visualize the vertical turning axis A (FIG. 1) of the turnable ladder 12 on the visual display 30. In FIG. 3, this axis A is marked on the screen 36 between the left and right bottom screen areas 42 and 44, showing the position of the vertical axis A with respect to the expected operating positions of the supports 16. It might also be possible to calculate the distance between the axis A and any obstacles in the environment of the vehicle 10, for example, the distance to a wall next to the vehicle 10, and to fade in this distance as a number or any visual marking. It will also be possible to highlight all markings in the respective image 32, including the visual marking 34 for the expecting operating position of the support 16, a visual marking showing an object 46 or any ground portion 48, according to the decision whether there is an overlap between the visual marking 34 and any other of the markings. This decision can be made by control unit 26. Such a highlighting feature may be interpreted as an alert by the operator to avoid any collision or positioning mistake. In case there is such an overlap of markings, indicating a collision, or any other positioning mistake, there can also be an acoustic alert to the operator.

As described above, all images 32 generated from the real time image data provided by the cameras 22 are shown at the same time in a split screen manner on the visual display. This enables the operator to judge the positioning of the supports 16 at different portions around the vehicle 10 at the same time, without having to change his own position to monitor the different ground areas 24 on eyesight without technical means. The visual display 30 can be mounted in the driver's cabin 50 (FIG. 1) of the vehicle 10, so that the driver can watch the visual display 30 with the split screen showing all four images 32 in different areas 38, 40, 42, 44 of the screen area 36 and maneuver the vehicle 10 at the same time.

The present invention is not only applicable to firefighting vehicles 10 but also to any other utility vehicles, especially those with an aerial apparatus like a turnable ladder or an aerial platform on top.

The invention claimed is:

1. A utility vehicle, in particular a firefighting vehicle (10), comprising an aerial apparatus like a turnable ladder (12) and/or an aerial rescue platform and lateral ground supports (16) that are movable between retracted positions and extracted operating positions in which the ends of the supports (16) rest on the ground, characterized by a monitoring system (28) for monitoring the position of the vehicle (10), comprising:

surveillance cameras (22) at the sides of the vehicle (10), each camera (22) being allocated to one support (16) to monitor the ground area (24) on which the end (20) of this support (16) rests in its operating position and to take a real-time image (32) of the respective ground area (24), a visual display (30) presenting the images (32) of all cameras (22) at the same time in different screen areas, superposed by visual markings (34) representing expected operating positions of the supports (16), and a control unit (26) provided to recognize objects (46) within a visual field of the cameras (22).

2. The utility vehicle according to claim 1, characterized in that said control unit (26) operates the visual display (30), said control unit (26) being provided to combine real-time image data generated by the cameras (22) with calculated or pre-stored data representing expected operating positions of the supports (16) to generate images (32) from these combined data in which the expected operating positions of the supports (16) are visualized by visual markings (34).

3. The utility vehicle according to claim 1, characterized in that the visual markings (34) are permanent markings on the screen of the visual display (30).

4. The utility vehicle according to claim 1, characterized in that the control unit (26) is provided to mark objects (46) recognized within the visual field of the camera (22) by means of visual markings.

5. The utility vehicle according to claim 1, characterized in that the control unit (26) is provided to calculate the distances between objects (46) recognized within the visual field of the camera (22) and the expected operating position of the support (16), the present operating position of the support (16) and/or a portion of the vehicle body (14) and to visualize the calculated distances within the image (32).

6. The utility vehicle according to claim 1, characterized in that the aerial apparatus is turnable around a vertical turning axis (A), and that the control unit (26) is provided for operating the visual display (30) to visualize the position of the turning axis (A).

7. The utility vehicle according to claim 1, characterized in that each camera (22) is fixed at the vehicle body (14) in an elevated position above its allocated support (16) with a downwardly tilted viewing angle.

8. The utility vehicle according to claim 1, characterized in that the cameras (22) are provided with infrared sensors.

9. The utility vehicle according to claim 1, characterized in that the visual display (30) is located within the driver's cabin (50) of the vehicle (10).

10. A method for positioning a utility vehicle, in particular a firefighting vehicle (10), that comprises an aerial apparatus like a turnable ladder (12) and/or an aerial rescue platform and lateral ground supports (16) that are movable between retracted positions and extracted operating positions in which the ends of the supports (16) rest on the ground, characterized by the following steps:

monitoring the ground area (24) on which the end of the support (16) rests in its operating position by means of a surveillance camera (22) that is allocated to this support (16), displaying the images (32) of all cameras (22) by means of a visual display (30) at the same time in different screen areas, superposed by visual markings (34) representing expected operating positions of the supports (16), and recognizing objects (46) within a visual field of the cameras (22) by means of a control unit (26).

11. The method according to claim 10, characterized by combining real-time image data generated by the cameras (22) with calculated or pre-stored data representing expected operating positions of the supports (16), and generating images (32) from these combined data in which the expected operating positions of the supports (16) are visualized by visual markings (34).

* * * * *